United States Patent
Caskey

(10) Patent No.: US 8,423,092 B2
(45) Date of Patent: Apr. 16, 2013

(54) POWER MANAGEMENT IN A MOBILE DEVICE

(75) Inventor: Mark Stirling Caskey, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 903 days.

(21) Appl. No.: 12/334,162

(22) Filed: Dec. 12, 2008

(65) Prior Publication Data

US 2010/0151919 A1 Jun. 17, 2010

(51) Int. Cl.
*H04W 68/00* (2009.01)
*H04W 52/02* (2009.01)

(52) U.S. Cl.
USPC .......................................... 455/574

(58) Field of Classification Search ............ 455/574
See application file for complete search history.

(56) References Cited

U.S. PATENT DOCUMENTS

| | | | |
|---|---|---|---|
| 2004/0176147 A1* | 9/2004 | Escalante | 455/574 |
| 2007/0010294 A1 | 1/2007 | Shinoda | |
| 2007/0159870 A1 | 7/2007 | Tanizaki et al. | |
| 2007/0180328 A1* | 8/2007 | Cornwell et al. | 714/42 |
| 2007/0270118 A1* | 11/2007 | Subramanian et al. | 455/343.2 |
| 2008/0146253 A1 | 6/2008 | Wentink | |
| 2008/0293396 A1 | 11/2008 | Barnes et al. | |

FOREIGN PATENT DOCUMENTS

| | | |
|---|---|---|
| EP | 1328066 A2 | 7/2003 |
| JP | 2003209616 A | 7/2003 |
| JP | 2005026912 A | 1/2005 |
| JP | 2007013665 A | 1/2007 |
| JP | 2007184063 A | 7/2007 |
| JP | 2008545295 A | 12/2008 |
| WO | 2006124550 | 11/2006 |
| WO | 2008011593 A2 | 1/2008 |

OTHER PUBLICATIONS

International Search Report—PCT/US2009/067677, International Search Authority—European Patent Office Mar. 25, 2010.
Written Opinion—PCT/ US2009/067677, International Search Authority—European Patent Office Mar. 25, 2010.
Taiwan Search Report—TW098142673—TIPO—Sep. 11, 2012.

* cited by examiner

*Primary Examiner* — Melvin Marcelo
(74) *Attorney, Agent, or Firm* — Sam Talpalatsky; Nicholas J. Pauley; Jonathan T. Velasco

(57) ABSTRACT

Apparatuses, systems and methods for reducing power consumption during standby operation of a mobile device are disclosed. A page decoding algorithm can be stored in nonvolatile memory during standby. The page decoding algorithm can be executed from the nonvolatile memory, when the mobile device is awakened from a sleep state to determine if there is any activity such as an incoming call. No power is required for the nonvolatile memory to maintain storage of the algorithm so that the power requirement during standby of the mobile device is reduced.

9 Claims, 4 Drawing Sheets

POWER MANAGEMENT IN A MOBILE DEVICE

FIELD OF DISCLOSURE

Embodiments of the invention are related to improving battery life. More particularly, embodiments of the invention are related to improving mobile device battery life by a structure which reduces the average current used during standby operation. In one embodiment, the structure within the mobile device may incorporate a Magnetoresistive Random Access Memory (MRAM) to store program data during standby.

BACKGROUND

With the vast and increasing numbers of functions to be performed by mobile devices comes an increased emphasis on battery life. In addition to increasing the ability of a battery to produce and maintain a sustainable long life, there is also an increasing interest into the ability of a mobile device to reduce requirements for total current consumption, not only during actual operation of the mobile device but also during quiescent states. A mobile device should be able to react to a call, a message, or other incoming communication in rapid order. This quick reaction ability conventionally involves the mobile device to preserve the processor state and the contents of high speed random access memory during the "sleep" phase of a mobile device, hence utilizing a "sleep current".

An example of the current utilization of a conventional mobile device during a quiescent state is shown in FIG. 1. When the mobile device is in the standby state, it may be in a sleep phase 110 for multiples of some period. For example, in a CDMA system the sleep phase may be for multiples of 1.28 seconds. Each paging channel monitoring phase lasts approximately 30 ms. As seen in the FIG. 1, even during the sleep phase 110 there may be an approximately 11 mA current draw, and during a wakeup phase 120 (e.g., during the Quick Page Channel (QPCH) decode) there may be a current draw of approximately 86 mA. As a result the average total current required from the battery during the sleep phase 110 and QPCH decode is approximately 2 mA ([(2.56−0.30)×1/2.56]+(0.30×86)/2.56=2 mA). As can be seen, for the illustrated typical operation, approximately one half of the total current utilization during standby is due to the sleep current of 1 mA. This current may typically be used in conventional architectures in order to preserve the state of volatile memory/internal registers.

FIG. 2 represents a conventional mobile device memory partitioning scheme wherein the power may be controlled by a Power Management Integrated Circuit (PMIC) 10. Power can be supplied to the mobile device processor (MDP) 12, the Flash memory 16 and the Synchronous Dynamic Random Access Memory (SDRAM) 14 during the "active" operation of the mobile device, such as, for example, calling and responding to an incoming call. The MDP 12 may include logic for mobile device operation and analog interfaces, and can further include one or more microprocessors and/or Digital Signal Processors (DSPs). The SDRAM 14 unit may be a volatile memory. The MDP 12 and the SDRAM may use the aforementioned 1 mA power during the sleep phase to preserve their state.

SDRAM such as shown in FIG. 2 is a subset of Random Access Memories (RAMs) in general. RAM can be stand alone devices and/or can be integrated or embedded within devices that use the RAM, such as microprocessors, microcontrollers, application specific integrated circuits (ASICs), system-on-chip (SoC), and other like devices. RAM can be volatile or non-volatile. Volatile RAM loses its stored information whenever power is removed. Non-volatile Flash memory can maintain its memory contents even when power is removed from the memory. Although Flash memory has advantages in the ability to maintain its contents without having power applied, it may have slower read/write times than volatile RAM. Moreover, there may be limitations regarding the number of write operations which can be performed on a Flash memory.

Accordingly, given the aforementioned conventional memory technologies, system designers may contend with difficult compromises between mobile device performance and energy efficiency, even during the sleep phase of the mobile device.

SUMMARY

Exemplary embodiments of the invention are directed to systems, apparatus and methods for improving operational battery life by reducing current demand during "sleep" periods by using low power high speed non volatile memory for storing program code.

Accordingly an embodiment of the invention can include a mobile device comprising: a nonvolatile memory configured to store a paging channel algorithm; a processor configured to execute the paging channel algorithm out of the nonvolatile memory and configured to decode a paging channel in response to a timing signal; and a controller configured to output the timing signal to the processor.

Another embodiment of the invention can include a power management apparatus comprising: a controller for controlling power to a mobile device during a standby phase which includes a sleep phase and a wakeup phase, said controller including a timer to initiate a power-up signal at an end of the sleep phase and a power-down signal during the sleep phase; a nonvolatile memory device configured to store a page algorithm to initiate an operation of the mobile device during the standby phase; and a processor configured to execute the page algorithm out of the nonvolatile memory in response to the power-up signal from said controller.

Another embodiment of the invention can include a method of power management in a mobile device, comprising: storing program code related to a page algorithm in a nonvolatile memory, wherein the program code is executed during a wakeup phase; powering down the mobile device while maintaining power to a timer; determining an interval for the wakeup phase by the timer; powering up the mobile device during the wakeup phase; and executing the program code out of the nonvolatile memory.

Another embodiment of the invention can include a mobile device power management system comprising: means for storing program code related to a page algorithm in a nonvolatile memory, wherein the program code is executed during a wakeup phase; means for powering down the mobile device while maintaining power to a timer; means for determining an interval for the wakeup phase by the timer; means for powering up the mobile device during the wakeup phase; and means for executing the program code out of the nonvolatile memory.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
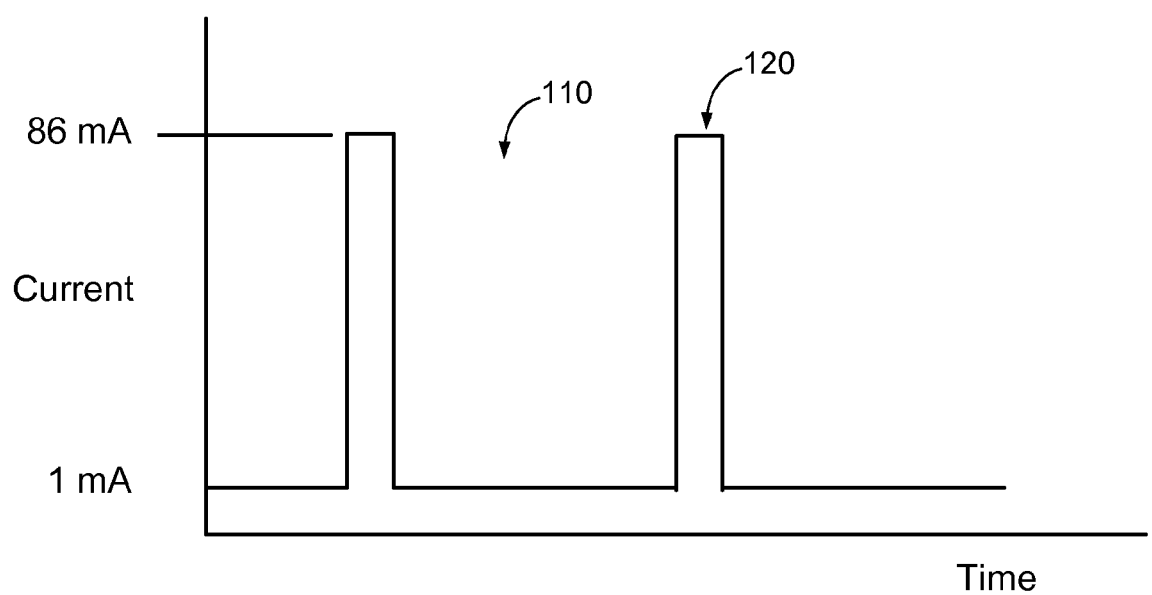
FIG. 1 illustrates a graph of a conventional current time profile of a mobile device during its quiescent phase.
Figure 2:
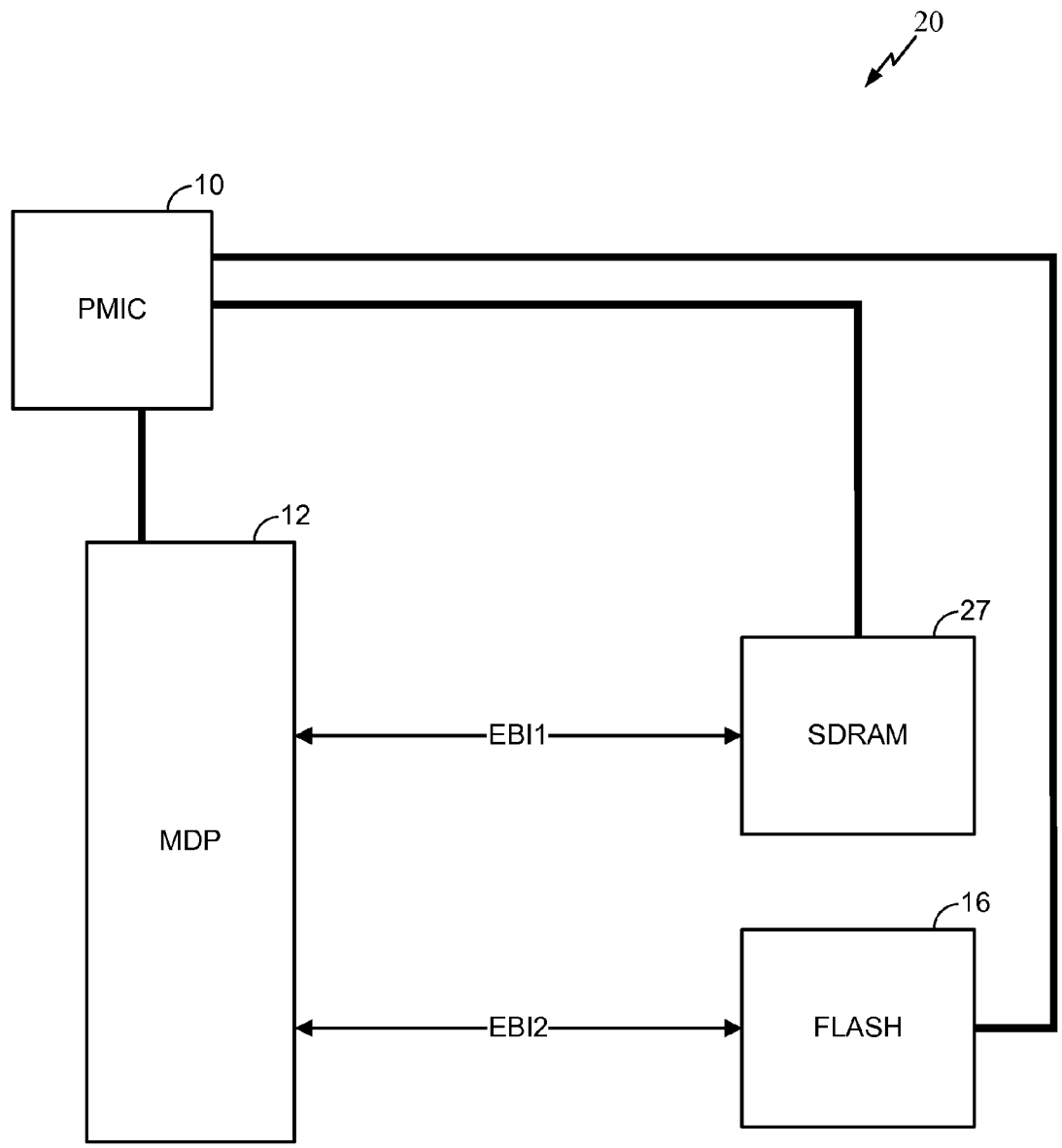
FIG. 2 illustrates a block diagram of a conventional mobile device power partitioning scheme.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

As used herein, the term "mobile device" may refer to any type of wireless communication device which may transfer information over a network. The mobile device may be any cellular mobile terminal, personal communication system (PCS) device, personal navigation device, laptop, personal digital assistant, or any other suitable capable of receiving and processing network and/or Satellite Position System signals. Moreover, as used herein, the term "network" may refer to any wireless communication network, including a wireless wide area network (WWAN), a wireless local area network (WLAN), a wireless personal area network (WPAN), and so on. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more Radio Access Technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN.

Figure 3:
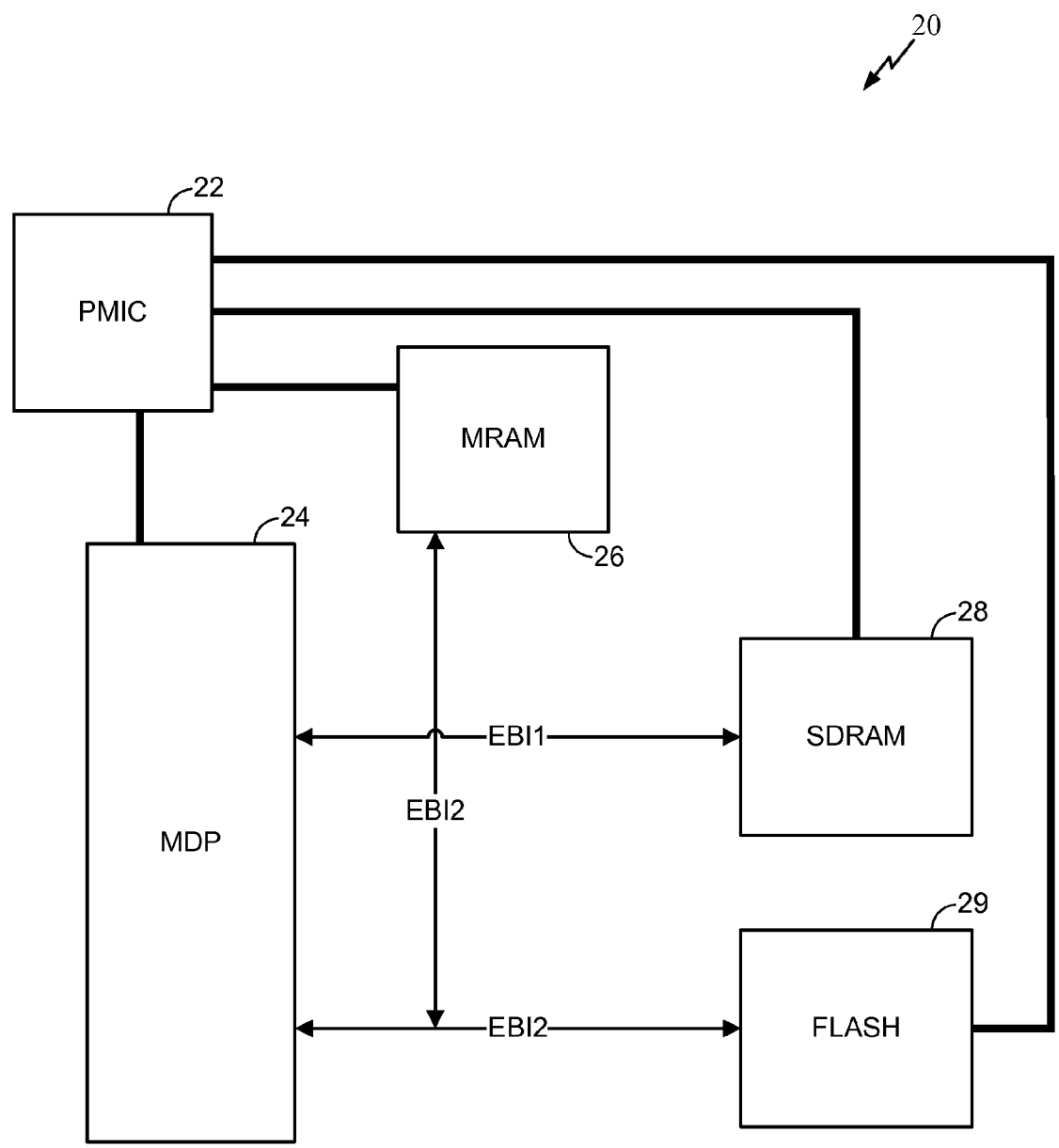
FIG. 3 illustrates a block diagram of a system for a mobile device power partitioning arrangement.

FIG. 3 illustrates a block diagram of a mobile device processor and power management system 20 having an exemplary power partitioning arrangement. Other well known elements and features of the mobile device such as the user interface, antenna, battery, transceivers, memory managers, etc. will not be illustrated or described herein. Likewise, well known processes/algorithms performed by the mobile device, such as receiving and decoding pages, sleep cycles, paging cycles, memory management, etc. will not be discussed in detail herein. However, it will be appreciated these well known elements and processes are included in mobile devices in embodiments of the invention.

In order to reduce power requirements during quiescent/standby operation, the system 20 may store selected program code in Magnetoresistive Random Access Memory (MRAM) 26 without consuming power during the sleep phase of the mobile device. During the sleep phase, the current consumption of system 20 may be primarily attributed to powering a timer (not shown) which may integrated into the PMIC 22, a separate device or may be integrated into any element in the mobile device that will be at least partially powered for the timer. For convenience and consistency of explanation the timer will be considered to be integrated into the PMIC 22 in the following descriptions. However, it will be appreciated that embodiments of the invention are not limited to the discussed timer arrangement and the timer functionality may reside in specific circuits, by program instructions being executed by one or more processors, or by a combination of both.

The timer can be used to determine when quick page decoding occurs. Magnetoresistive Random Access Memory (MRAM) 26 may provide non-volatile storage for data and/or program instructions. The program instructions may include, for example, the algorithms for monitoring the paging channel. In various embodiments, program instructions responsible for performing different functions may also be stored. The mobile device may spend the majority of its time in the quiescent state. The mobile device may only become active (i.e., "wake up") when the user initiates a call, or when the status of the paging channel indicates that a response is appropriate. Upon entering the active state, the mobile device may transfer the application program code appropriate for providing a response from MRAM 26 to Flash memory 29 and/or SDRAM 28. However, usually it will be the case that no response will be required, and the mobile device can power down until it is time to decode the next paging channel.

System 20 includes the mobile device processor (MDP) 24, which may transfer data and/or program code to/from Flash memory 29 and/or MRAM 26 across memory interface EBI2. The MDP 24 may also transfer data and/or program code with SDRAM 28 across memory interface EBI1. Although shown as separate from the MDP 24, the MRAM 26, Flash memory 29, and/or the SDRAM 28 could reside on the digital portion of the die within the MDP 24. Such packaging arrangements could eliminate any size impact on the system 20 while reducing power consumption. Accordingly it will be appreciated that the configurations illustrated and discussed herein are merely provided for convenience of explanation and embodiments of the invention are not limited to the these examples. For example, the functional blocks and the associated functionalities illustrated in relation FIG. 3 may be separated in various manners or may be integrated into one functional device.

The PMIC 22 may control and supply power to each of the components in system 20 over dedicated power lines (indicated in bold). This control can be used to determine the sleep/awake phases of the mobile device in order to save power. As mentioned above, the PMIC may further include a timer (not shown) which can be used to determine the appropriate time to perform a quick decode of the paging channel. During the wakeup phase, the PMIC 22 may supply power to each of the components of system 20 shown in FIG. 3. During the sleep phase, the PMIC 22 may only provide power to its internal timer so the paging channel can be properly decoded. The PMIC may include a processor and/or other configurable logic (e.g., FPGA) so it may be programmed to configure the system 20 for the various operational modes.

As described previously, for a conventional mobile device there may be an average current draw of, for example, 2 mA for quiescent operation. In these conventional devices, fifty percent of this current (1 mA) may be used to preserve the state of volatile memory. The system of FIG. 3 may reduce the sleep current by having the MDP copy a paging channel decode algorithm to the MRAM 26. MRAM 26 is able to retain the algorithm in a ready condition without drawing current because MRAM 26 is a low power, non-volatile memory. Because MRAM has the additional capability of high speed operation, program code stored therein may be directly read out of the MRAM 26 for execution by the MDP 24. Therefore because the algorithm for monitoring the paging channel can be executed out of MRAM 26, the MDP 24 and the SDRAM 28 can then be powered down when not monitoring the paging channel, i.e. during the 2.56 s sleep phases. While the other device are powered down during the sleep phase, the timer resident in the PMIC 22 is operated in order to power up, the mobile device in time to monitor the paging channel. Due to the non-volatile nature of MRAM 26, the program code stored in MRAM 26 may not be lost or corrupted during the power shut down.

In one embodiment, a mobile device may utilize the memory architectures and power partitioning described herein. The current draw during the "sleep" interval for the mobile device may be reduced to approximately 10 μA during intervals between Quick Page Channel (QPCH) decodes. With the reduction of the conventional 1 mA "sleep" current, the average current requirement during quiescent operation is reduced by 50 percent.

FIG. 3 shows an embodiment of the power partitioning system where non-volatile storage may be partitioned between MRAM 26 and Flash memory 29. Because the cost of providing significant amounts of non-volatile storage using MRAM may be prohibitive, in some embodiments portions of program code and/or data, which will be read and directly executed by the MDP as it exits from the sleep state, will be stored in MRAM 26. Other code not requiring quick access may be stored in Flash memory. However, as MRAM technology matures and costs are reduced, other embodiments may replace the Flash memory and/or SDRAM, and only use MRAM for all of the program code and/or data storage.

The various memory modules can be stand alone devices or can be integrated or embedded within devices that use the memory, such as microprocessors, microcontrollers, application specific integrated circuits (ASICs), system-on-chip (SoC), and other like devices as will be appreciated by those skilled in the art. Random Access Memory (RAM) can be volatile or non-volatile. Volatile RAM loses its stored information whenever power is removed. Non-volatile RAM can maintain its memory contents even when power is removed from the memory. Although non-volatile RAM has advantages in the ability to maintain its contents without having power applied, conventional non-volatile RAM, conventionally taking the form of Flash memory, may have slower read/write times than volatile RAM. Flash memory may also have limitations on the number of times it can be written to before it starts to malfunction. Magnetoresistive Random Access Memory (MRAM) is a non-volatile memory technology that has response (read/write) times comparable to volatile memory. In contrast to conventional RAM technologies which store data as electric charges or current flows, MRAM uses magnetic elements. The nonvolatile memory of MRAM 26 provides fast access time comparable to the access time of SRAM. Additionally, MRAM 26 also provides for a substantially greater number of write operations before failure, when compared with the limited number of write operations available for Flash memory. Thus the MRAM memory partitioning scheme of FIG. 3 provides approximately twice the standby life for a battery operated mobile device, because it reduces the current usage in half for standby/quiescent operation.

Figure 4:
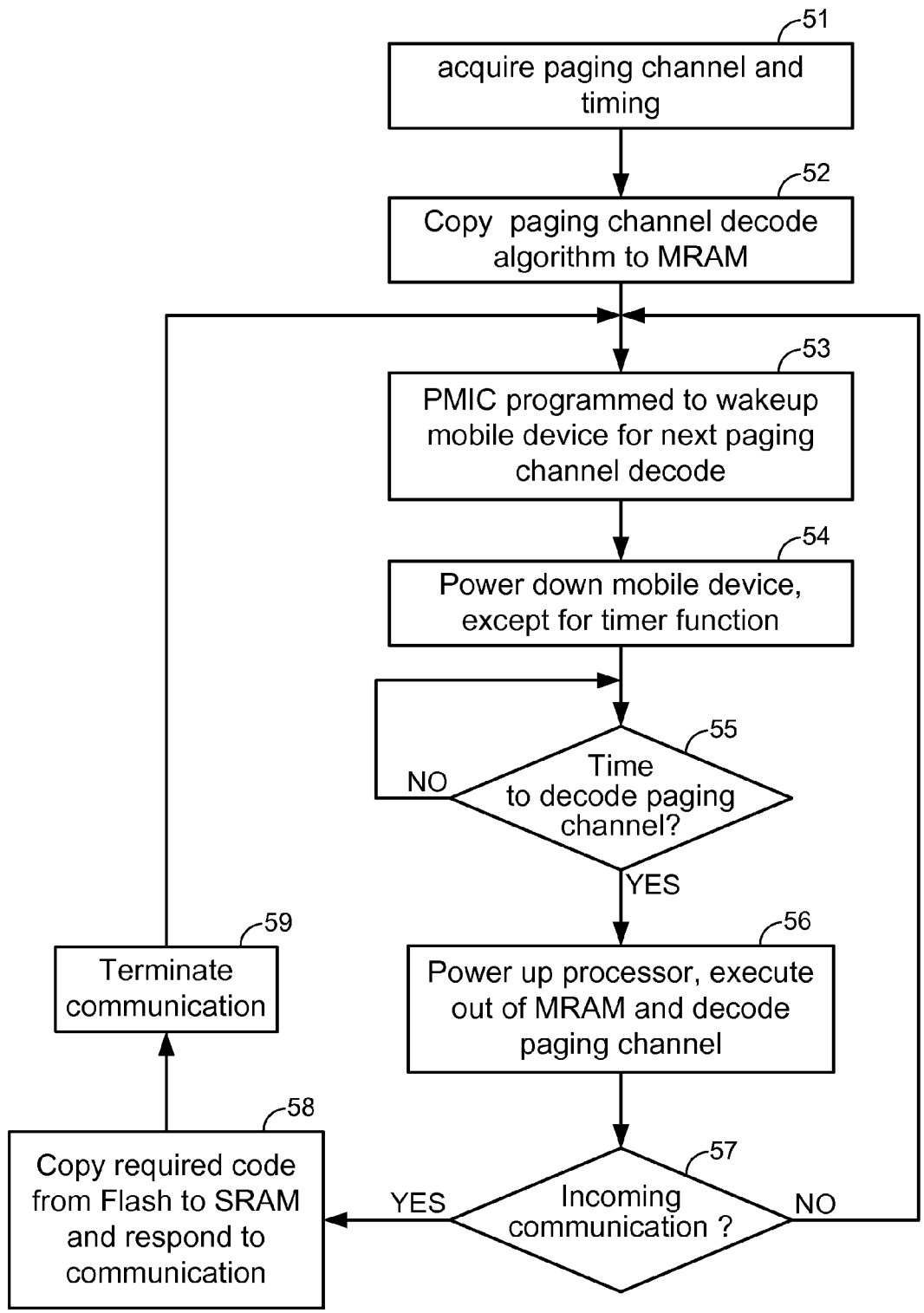
FIG. 4 is a flow chart illustrating a process for managing power of a mobile device.

FIG. 4 illustrates a flowchart of the operation of the partitioning scheme which may be performed in system 20. The mobile device may acquire a paging channel and timing information (Block 51) (e.g., at boot up). The information may be read out of Flash memory 29, or obtained using other conventional approaches. Subsequently, program code which may be executed after the MDP 24 exits from the sleep phase may be copied from the Flash memory 29 to the MRAM 26 (Block 52). As mentioned previously, this program code may include the paging channel decode algorithm. Other embodiments may include program code for other functionality (e.g., code for operating the user interface such as the keyboard and/or display). The PMIC 22 may then be programmed to wake up the mobile device at predetermined times to perform paging channel decoding (Block 53). After being programmed, the PMIC 22 may power down the components in the mobile device except for the timer within the PMIC (Block 54). The timer may then control whether it is time to decode the paging channel (Block 55). After each expiration of the timing period, the PMIC 22 directs the MDP 24 to power up and execute out of MRAM 26 the stored program code which decodes the paging channel (Block 56).

If the message decoded from the paging channel indicates there is an incoming communication (Block 57), program code (which provides instruction for the MDP 24 to execute the appropriate functionality to handle the incoming communication) may be copied from Flash memory 29 to SDRAM 28. Once the incoming communication terminates (Block 59), the process may return to Block 53 where the PMIC is programmed to wake up the mobile device for the next paging channel decode.

If the message decoded from the paging channel indicates there is no incoming communication, program control is transferred back to Block 53, where the process in Blocks 53-57 may continue to repeat until another incoming call is detected Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for reducing power consumption during standby operation of a mobile device. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of embodiments of the invention as defined by the appended claims. For example, other nonvolatile memory devices (e.g., Spin Transfer Torque MRAM (STT-MRAM)), which are able to store the paging algorithm without power being required to retain the algorithm could be used instead of the MRAM discussed herein. Likewise, the functions, steps and/or actions of the methods in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A mobile device comprising:
   a nonvolatile memory configured to store a paging algorithm, wherein the nonvolatile memory is Magnetoresistive Random Access Memory (MRAM);
   a processor configured to execute the paging algorithm out of the nonvolatile memory and configured to decode a paging channel in response to a timing signal, wherein the processor is a mobile device processor (MDP) and wherein said MRAM is integrated into the MDP;
   a controller configured to output the timing signal to the processor, wherein the controller is further configured to supply power to an operational part of the mobile device during a paging channel monitoring phase and is configured to remove power from the operational part of the mobile device during intervals between the paging channel monitoring phase;
   a Flash memory device; and
   a Synchronous Dynamic Random Access Memory (SDRAM), wherein the SDRAM communicates with the MDP on a first memory interface and wherein the Flash memory communicates with the MDP and the nonvolatile memory on a second memory interface.

2. The mobile device of claim 1, wherein the operational part of the mobile device includes the MDP, Flash memory device, SDRAM and nonvolatile memory.

3. The mobile device of claim 1, wherein the controller comprises a timer configured to generate the timing signal.

4. The mobile device of claim 1, wherein the nonvolatile memory is Spin Transfer Torque MRAM (STT-MRAM).

5. A method of power management in a mobile device comprising:
   storing program code related to a page algorithm in a nonvolatile memory, wherein the program code is executed during a wakeup phase;
   powering down the mobile device while maintaining power to a timer;
   determining an interval for the wakeup phase by the timer;
   powering up the mobile device during the wakeup phase;
   executing the program code out of the nonvolatile memory, wherein executing the program code comprises decoding a paging channel;
   detecting an incoming communication directed to the mobile device;
   copying code from a Flash memory to a Synchronous Dynamic Random Access Memory (SDRAM); and
   responding to the incoming communication.

6. The method of power management of claim 5, wherein said nonvolatile memory is at least one of Magnetoresistive Random Access Memory (MRAM) or Spin Transfer Torque MRAM (STT-MRAM).

7. The method of power management of claim 5, further comprising:
   acquiring paging channel and timing information.

8. A mobile device power management system comprising:
   means for storing program code related to a page algorithm in a nonvolatile memory, wherein the program code is executed during a wakeup phase;
   means for powering down the mobile device while maintaining power to a timer;
   means for determining an interval for the wakeup phase by the timer;
   means for powering up the mobile device during the wakeup phase; and
   means for executing the program code out of the nonvolatile memory.

9. The mobile device power management system according to claim 8, wherein said storing program code is at least one of Magnetoresistive Random Access Memory (MRAM) or Spin Transfer Torque MRAM (STT-MRAM).

\* \* \* \* \*